(12) United States Patent
Vila

(10) Patent No.: US 6,890,196 B2
(45) Date of Patent: May 10, 2005

(54) SYSTEM FOR REMOVING AND OPENING THE LID OF THE DISTRIBUTION BOX OF VEHICLES

(75) Inventor: Joan Vila, Valls (ES)

(73) Assignee: Lear Automotive (EEDS) Spain, S.L., Tarragona (ES)

(*) Notice: Subject to any disclaimer, the term of this patent is extended or adjusted under 35 U.S.C. 154(b) by 0 days.

(21) Appl. No.: 10/415,743

(22) PCT Filed: Nov. 3, 2001

(86) PCT No.: PCT/ES01/00418

§ 371 (c)(1),
(2), (4) Date: Sep. 30, 2003

(87) PCT Pub. No.: WO02/36915

PCT Pub. Date: May 10, 2002

(65) Prior Publication Data

US 2004/0077195 A1 Apr. 22, 2004

(30) Foreign Application Priority Data

Nov. 3, 2000 (ES) .................................. 200002684 U

(51) Int. Cl.⁷ .............................................. H01R 3/00
(52) U.S. Cl. ......................... 439/165; 16/259; 16/257; 439/822
(58) Field of Search ............................. 439/521, 76.2, 439/135, 427, 822, 165; 174/152, 156, 157, 50; 16/259, 257; 220/837–843

(56) References Cited

U.S. PATENT DOCUMENTS

| | | | | |
|---|---|---|---|---|
| 3,126,120 A | * | 3/1964 | crate ........................... | 220/844 |
| 4,161,261 A | * | 7/1979 | Frater .......................... | 220/826 |
| 4,466,541 A | * | 8/1984 | Tabler et al. ................ | 206/506 |
| 5,048,715 A | * | 9/1991 | Wolff ........................... | 220/832 |
| 5,146,650 A | * | 9/1992 | Robertson .................... | 16/259 |
| 5,311,643 A | * | 5/1994 | Marquardt et al. ........... | 16/267 |
| 5,357,565 A | * | 10/1994 | Butler et al. ................. | 379/412 |
| 6,000,550 A | * | 12/1999 | Simpson et al. ............. | 206/711 |
| 6,099,097 A | * | 8/2000 | Hocker et al. ............... | 312/327 |
| 6,338,181 B1 | * | 1/2002 | Hwang ......................... | 16/266 |
| 6,461,026 B1 | * | 10/2002 | Wang ........................... | 16/267 |

* cited by examiner

Primary Examiner—Briggitte R. Hammond
(74) Attorney, Agent, or Firm—Sughrue Mion, PLLC

(57) ABSTRACT

An extraction and opening system of vehicle distribution box lids applicable to electric distribution boxes in vehicles of the type having an opening system by means of hinges or by means of its complete extraction, since the box has a cylindrical pin on one of its sides being introduced into the hinges arranged on the box lid.

11 Claims, 2 Drawing Sheets

SYSTEM FOR REMOVING AND OPENING THE LID OF THE DISTRIBUTION BOX OF VEHICLES

This application is a 371 of PCT/ES01/00418, filed Nov. 2, 2001, the disclosure of which is incorporated herein by reference.

OBJECT OF THE INVENTION

The present invention consists of an extraction and opening system of vehicle distribution box lids. Said system is arranged on a terminal box providing the electric energy distribution between different automobile parts, and comprising inside a determined integration and interconnection architecture between signal circuits and power circuits arranged on printed circuit plates. The relays and fuses are also located inside these boxes that have to be replaced by others in optimal conditions in the case of a breakdown.

STATE OF THE ART

There are currently different ways of opening the boxes, but in the automobile sector, there are only two ways of opening service or distribution boxes. One is the traditional box opening by means of hinges and the other consists of the complete extraction of the box lid.

Due to space reduction in the vehicle, the service or distribution boxes many times are located in inaccessible areas for the operator, complicating its handling, therefore the placement of one type of box or another is decided in function of the place it occupies in the vehicle.

In addition, the opening of said boxes is currently effected in many different ways due to the previously mentioned problem of reduced spaces in the inner part of the area reserved for the vehicle's electronic circuitry, this making the box many times almost inaccessible by not being able to properly open it.

In Spanish application 9703248U, an electric terminal box can be observed having a hinge system on its back part and a screw system in the front part to close it. By means of this system, the box partially opens by one side of the lid always being next to one side of the box.

In Spanish application 98700032U, a complete box opening applied to packaging is disclosed, in which the closing system is characterized in that it has tabs on the four sides of the lid coinciding with four hooks located on each side of the box. Although the system is applied to a different sector from that of the present invention, it represents another possible lid and box closing type.

The proposed invention permits reducing production costs since a single distribution box model can be placed in different vehicle models due to its main feature permitting us to open one box with the two already existing and disclosed systems, by means of a partial opening with hinges or by means of a total box opening by extracting the lid.

DESCRIPTION

The invention consists of providing a service or distribution box opening system that can be used in two different ways. The first consists of the box lid opening in a traditional manner by means of a system similar to that of hinges and the second manner of opening consists of completely extracting the lid.

The manner of fitting the lid to the box is carried out by means of a cylindrical pin located on one side of the box, serving to keep the lid fixed to the box in addition to being able to rotate said lid with respect to the cylindrical pin or axis.

The hinges are constituted of a determined number of semicylindrical bodies, joined to the lid at one end and to the semicylinder next to it at the other end through a tab of the same material. Between two semicylinders or hollow hinges, there is a space that after exerting pressure on the lid and exerting force on the pin, the previously mentioned spaces will be occupied by the pin or pins.

To completely extract the lid, an upward, vertical force must be exerted on the tab joining the hinges or semicircles.

The flat tab joining the semicircles is also intended to prevent the lid from involuntarily coming off the spin axis when it rotates on the pin.

DESCRIPTION OF THE DRAWINGS

To facilitate the understanding of the extraction and opening system of vehicle distribution box lids, different drawings are attached to the present patent application for the purpose of better understanding the fundamentals on which the invention concerning us is based and the better understanding of a preferred embodiment of the invention, keeping in mind that the character of the drawings is illustrative and non-limiting.

PREFERRED EMBODIMENT OF THE INVENTION

Figure 1:
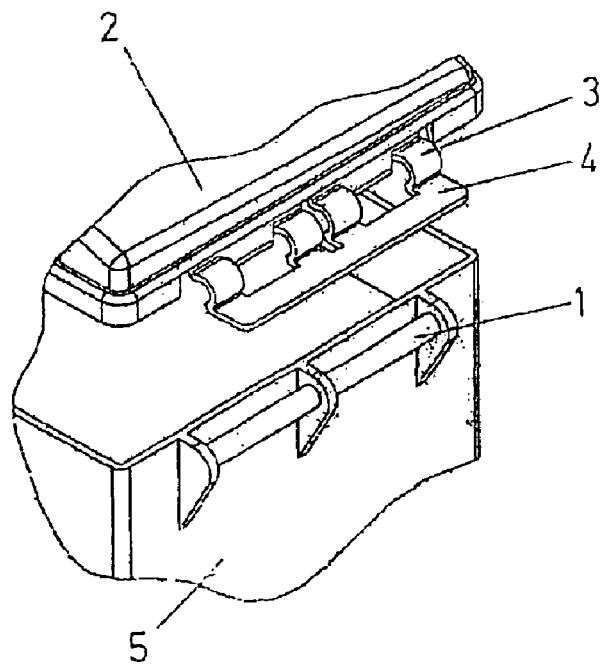
FIG. 1 shows the arrangement of the cylindrical pin placed on the box and the arrangement of the hollow, semicylindrical bodies with the flat tab joining them.
Figure 2:
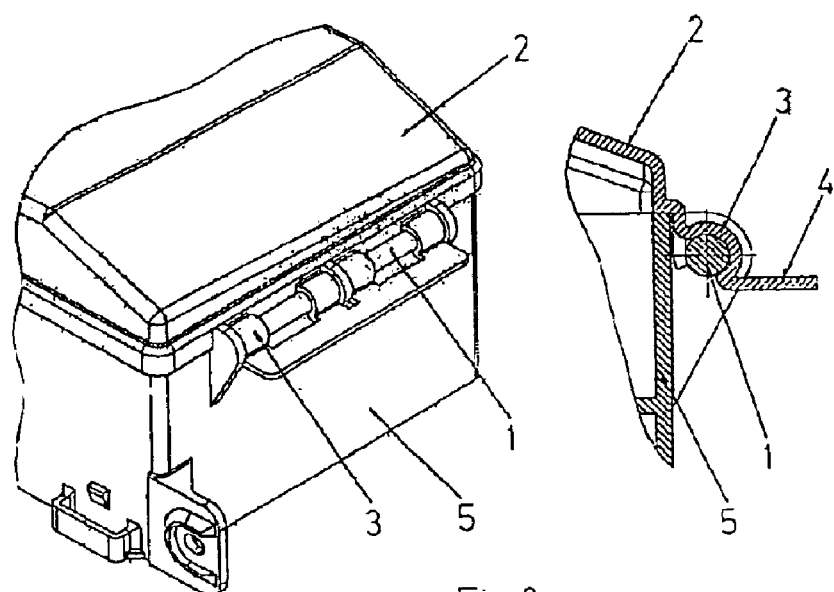
FIG. 2 shows the lid and box joined as well as an assembly section.
Figure 3:
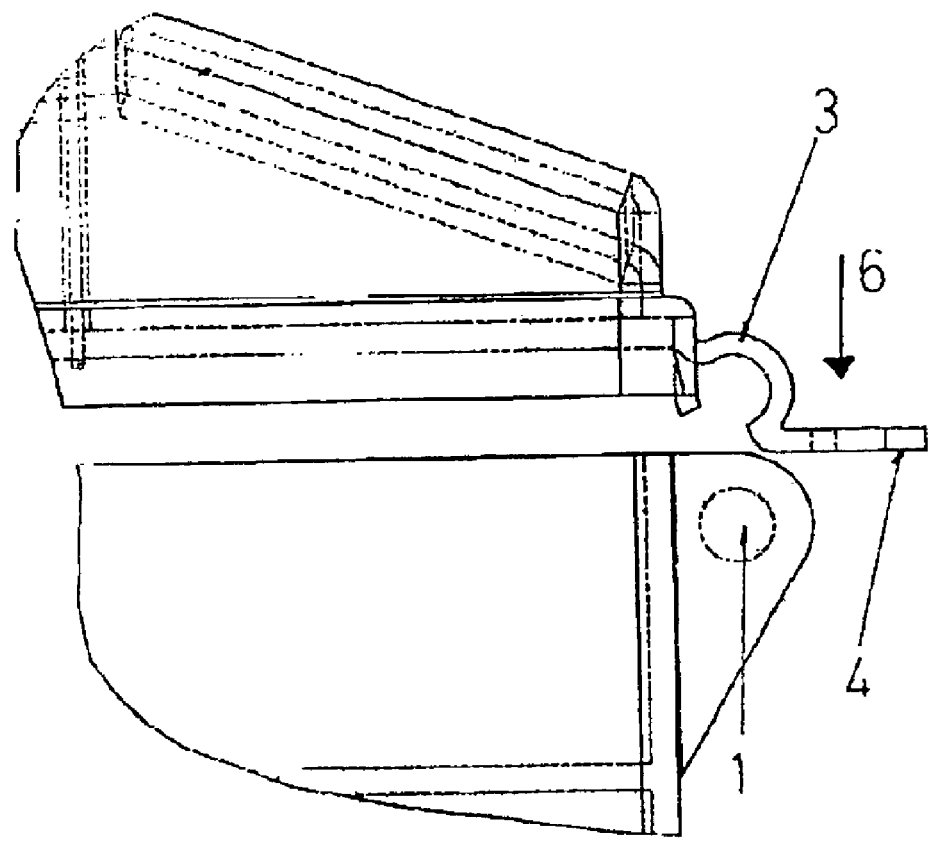
FIG. 3 shows how to exert the force for fitting the lid on the box.
Figure 4:
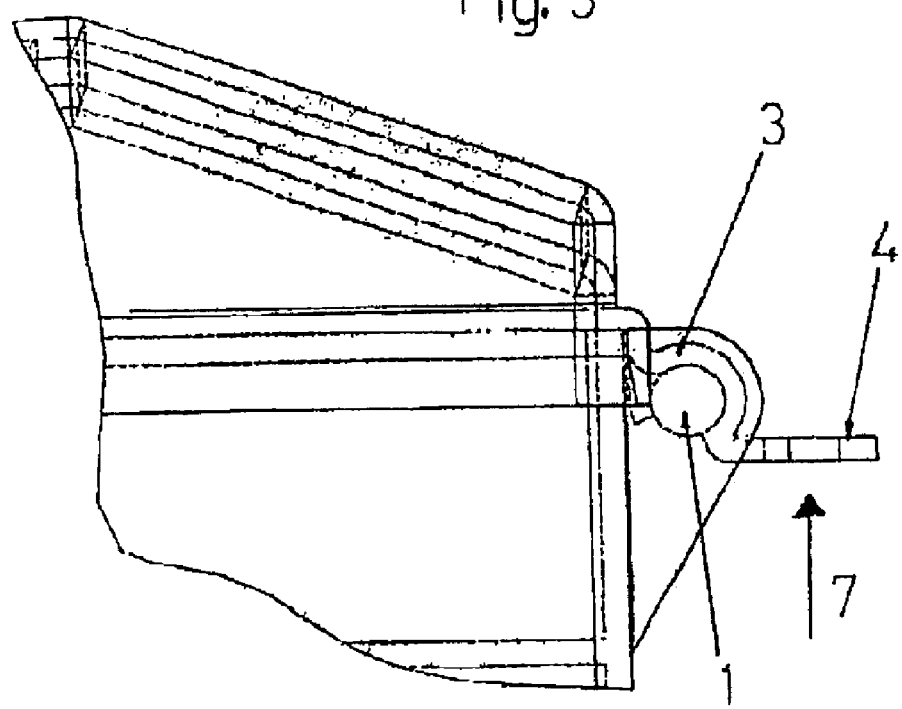
FIG. 4 shows how to exert the force for extracting the lid from the box.

One embodiment of the proposed invention, the extraction and opening system of vehicle distribution box lids, consists of manufacturing a hinge system in which the two methods of opening the electric distribution box lid are compatible. It consists of placing a cylindrical pin 1 on one side of the box 5, being responsible for the lid 2 remaining fixed and also being able to rotate in relation to this pin.

The hinges 3 are constituted of four hollow, semicylindrical bodies whose purpose is to fit perfectly on the cylindrical pin 1, thus the lid 2 and the box 5 being perfectly coupled.

The ends of the semicylindrical bodies are joined to the lid 2 at one end, and the other end is joined to a tab 4 joining the four semicylindrical bodies 3.

The function of the tab 4 is to act as a butt for the lid in the moment of rotating and to also serve as a point of exerting the necessary force for the lid 2 assembly or disassembly.

The manner of coupling the lid 2 to the box 5 is by means of pressure, since the four semicylindrical bodies 3 are of a plastic material, upon exerting downward pressure 6 on the tab 4, the semicylindrical bodies are deformed, permitting a perfect anchoring between the semicylindrical bodies 3 and the cylindrical pin 1 once these are introduced on the pin 1.

To disassemble the box, the inverse operation of that previously described occurs, the only variation with respect to the previous is the force that must be exerted on the tab, in this case being upward 7.

What is claimed is:

1. An extraction and opening system of a vehicle distribution box lid for an electric distribution box in a vehicle of a type having an opening system by means of hinges or by means of the total extraction of the box lid, characterized in that the box (5) has a cylindrical pin (1) on a side, the cylindrical pin introduced into a determined number of binges (3) arranged on the lid (2) of the box (5) to form a hinge connection, said hinges (3) being constituted by four or more semicylindrical bodies and a tab extending outward from the hinge connection, such that upon exerting a vertical force on the tab, the lid (2) is extracted from the box (5) or placed on the box (5).

2. The extraction and opening system of claim 1, characterized in that the tab (4) serves as a rotational butt for the lid (2) with respect to the pin (1).

3. The extraction and opening system of claim 1, characterized in that a material of the lid (2) and particularly of the hinges (3) is a hard-flexible plastic.

4. The extraction and opening system of claim 1, wherein, when the lid closes the box, the tab extends in a horizontal direction that is substantially orthogonal to an adjacent side wall of the box.

5. A box assembly for a vehicle, comprising:
   a box having an opening at a top of the box; and
   a lid for closing the opening; and
   wherein the lid is removably coupled to the box by a coupling, the coupling comprising:
      a pin provided on the box and extending horizontally along a side of the box; and
      a hinge portion provided on the lid and snap-fit onto the pin to form a hinge connection; and
   wherein, the lid further comprises a tab which extends from the lid in a direction outward from the lid and the box, such that upon exerting a force on the tab, the hinge connection is decoupled and the lid is separated from the box.

6. The box assembly of claim 5, wherein a material of the hinge portion is a hard-flexible plastic.

7. The box assembly of claim 5, wherein the box has four vertical side walls and a bottom wall.

8. The box assembly of claim 5, wherein the box contains electronics that remain disposed therein upon removal of the lid.

9. A box assembly for a vehicle, comprising:
   a box having an opening at a top of the box; and
   a lid for closing the opening;
   wherein the lid is removably coupled to the box by a coupling, the coupling comprising:
      a pin provided on the box and extending horizontally along a side of the box; and
      a partially cylindrical portion provided on the lid and snap-fit onto the pin to form a hinge connection; and
   wherein the lid further comprises a tab extending outward from the partially cylindrical portion, such that upon exerting a vertical force on the tab, the hinge connection is decoupled and the lid is separated from the box.

10. The box assembly of claim 9, wherein the tab functions as a rotational butt for the lid with respect to the pin.

11. The box assembly of claim 9, wherein, when the lid closes the box, the tab extends in a horizontal direction that is substantially orthogonal to an adjacent side wall of the box.

* * * * *